(12) United States Patent
Sawahata et al.

(10) Patent No.: US 6,441,127 B1
(45) Date of Patent: Aug. 27, 2002

(54) ALIGNMENT TREATING AGENT FOR LIQUID CRYSTAL CELL

(75) Inventors: Kiyoshi Sawahata; Toyohiko Abe; Yoshihiro Tsuruoka; Hiroyoshi Fukuro, all of Funabashi (JP)

(73) Assignee: Nissan Chemical Industries Ltd., Tokyo (JP)

( * ) Notice: Subject to any disclaimer, the term of this patent is extended or adjusted under 35 U.S.C. 154(b) by 0 days.

(21) Appl. No.: 08/183,332

(22) Filed: Jan. 19, 1994

(30) Foreign Application Priority Data

Jan. 22, 1993 (JP) ............................................ 5-009488

(51) Int. Cl.$^7$ ......................... C08G 73/10; C09K 19/00
(52) U.S. Cl. ..................... 528/353; 528/170; 528/172; 528/173; 528/185; 528/188; 528/220; 528/229; 528/350; 428/1.1; 428/1.2; 428/1.26; 427/322; 427/379; 427/393.5
(58) Field of Search ......................... 428/1.1, 1.2, 1.26; 528/353, 172, 350, 173, 220, 229, 185, 188, 170; 427/322, 379, 393.5; 252/299.1

(56) References Cited

U.S. PATENT DOCUMENTS

| | | | |
|---|---|---|---|
| 4,634,228 A | * | 1/1987 | Iwasaki et al. ................. 428/1 |
| 4,749,777 A | * | 6/1988 | Kohtoh et al. .................. 428/1 |
| 5,147,682 A | * | 9/1992 | Takiguchi et al. .............. 428/1 |
| 5,276,132 A | * | 1/1994 | Nishikawa et al. .......... 528/353 |
| 5,298,590 A | * | 3/1994 | Isogai et al. ................. 528/170 |
| 5,350,539 A | | 9/1994 | Mishina et al. .................... 8/92 |
| 5,419,932 A | | 5/1995 | Togano et al. ............... 428/359 |

FOREIGN PATENT DOCUMENTS

| | | |
|---|---|---|
| EP | 0 160 302 | 11/1985 |
| EP | 0 365 855 | 5/1990 |
| EP | 0 499 159 | 8/1992 |
| EP | 0 527 439 | 2/1993 |
| GB | 2 261 741 | 5/1993 |
| JP | A-4-255827 | 10/1992 |
| TW | 244954 | 4/1995 |

OTHER PUBLICATIONS

*Encyclopedia of Chemical Technology*, pp. 380–385, vol. 15, 4th ed. Kirk–othme, Lasers To Mass Spectrometry, Liquid Crystalline Material's The date of publication is not available.*

Merck Co., Product Information Sheet of Merck Co., Apr. 10, 1986 Nematic Mixtures.*
WPAT, An 94–224546/27, TW–A–224953, Jun. 11, 1994.
Jpn. J. Appl. Phys., vol. 32, No. 98, Sep., 1993, pp. 4352–4355, Chiyoshi Nozaki, et al., "Factors Controlling Pretilt Angles Of Polyimide Alignment Film For Liquid Crystal Displays".

* cited by examiner

*Primary Examiner*—P. Hampton-Hightower
(74) *Attorney, Agent, or Firm*—Oblon, Spivak, McClelland, Maier & Neustadt, P.C.

(57) ABSTRACT

An alignment treating agent for a liquid crystal cell, which comprises a polyimide resin of the formula (I):

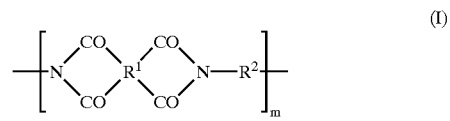

wherein $R^1$ is a tetravalent organic group constituting a tetracarboxylic acid or its derivative, $R^2$ is a bivalent organic group constituting a diamine, and m is a positive integer, provided that at least 10 mol % of $R^2$ is a bivalent organic group selected from the group consisting of:

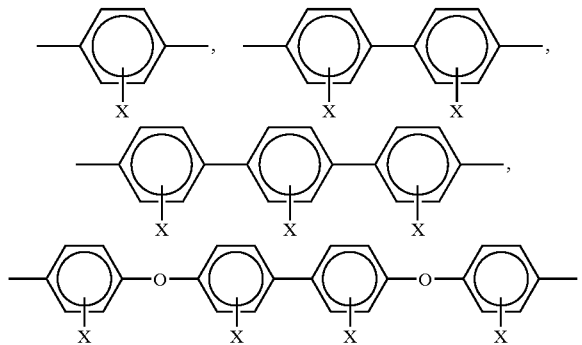

wherein X is H, OH, an alkyl group, an alkoxy group, a carboxyl group, an acyl group or a halogen atom, said polyimide resin being made insoluble in an organic solvent by coating a precursor solution of said polyimide resin on a substrate, followed by heating.

10 Claims, No Drawings

ALIGNMENT TREATING AGENT FOR LIQUID CRYSTAL CELL

The present invention relates to an alignment treating agent for a liquid crystal. More particularly, it relates to an alignment treating agent for a liquid crystal cell, whereby the tilt angle of liquid crystal molecules to the substrate is stabilized against rubbing conditions.

Heretofore, organic resin films such as polyimide resin films have been most commonly used as treating agents for substrates to align nematic liquid crystal molecules substantially in parallel with transparent substrates of e.g. glass or plastic films provided with transparent electrodes.

Further, as a method for alignment treatment to align liquid crystal molecules in a predetermined direction, a so-called rubbing method is most common as an industrial method for alignment treatment which comprises rubbing an organic resin film formed on a substrate, with a cloth in a predetermined direction.

In such a case, it is known that when a liquid crystal is sandwiched by a pair of substrates treated by such rubbing treatment, liquid crystal molecules will be aligned in the rubbing direction, and at the same time, such liquid crystal molecules will have a certain tilt angle against the substrate surface.

This tilt angle is very important to conduct liquid crystal display uniformly, and the degree of the tilt angle is known to be influenced especially by the nature of the alignment treating agent such as a polyimide.

Among various liquid crystal display systems, a liquid display system commonly called STN (super-twisted nematic) requires a particularly high tilt angle of at least a few degrees against the substrate surface.

As a method for aligning liquid crystal molecules with a large tilt angle by means of an organic resin film of e.g. polyimide, a method of introducing a long chain alkyl group to the polyimide or a method of using a diamine having a perfluoro group, has been known. For example, methods disclosed in Japanese Unexamined Patent Publications No. 142099/1987, No. 259515/1988 and No. 262527/1989 may be mentioned. By using the alignment treating agents for liquid crystal cells prepared by these methods, it is possible to align liquid crystal molecules with a large tilt angle to the substrate surface.

Further, it is important to increase the uniformity and stability of the tilt angle within the substrate surface area to obtain a uniform display. Especially, it is practically very important to improve the uniformity of the thermal stability of the tilt angle or the uniformity of the tilt angle by rubbing treatment.

Polyimide resins commonly employed as alignment treating agents are generally classified into polyimides which are insoluble in organic solvents and precursor solutions of which are coated on substrates, followed by dehydration ring closure to form polyimide resin films and so-called solvent-soluble polyimides which are soluble in organic solvents.

Polyimide resins which have been used for a STN display system, are usually insoluble in organic solvents. Therefore, it has been common to employ a method which comprises coating a precursor solution of a polyimide resin on a substrate and heating and calcining the coated solution to form a polyimide resin film. It is known that such a polyimide resin insoluble in an organic solvent usually presents a high thermal stability of the tilt angle and is capable of maintaining the high tilt angle even when heated after injection of a liquid crystal.

On the other hand, the tilt angle obtainable by a polyimide soluble in an organic solvent is not necessarily adequate from the viewpoint of thermal stability, and there is a problem that the tilt angle is likely to substantially decrease when heated after injection of a liquid crystal. To solve such a problem of a polyimide resin soluble in an organic solvent, a method as disclosed in Japanese Patent Application No. 202917/1991, may be mentioned.

On the other hand, even if a tilt angle when treated under a certain specific rubbing condition, is thermally stable, such a tilt angle may sometimes change by a change of the rubbing condition, and the thermal stability of the tilt angle and the change due to the rubbing condition may not necessarily attributable to the same factor. Therefore, the stability of the tilt angle against rubbing can not simply be determined from the degree of the thermal stability. Namely, to obtain a more uniform liquid crystal display, a means of realizing a uniform tilt angle stable against rubbing is required in addition to the thermal stability of the tilt angle. To align liquid crystal molecules in a predetermined direction by an organic resin film of e.g. polyimide formed on a substrate surface, it is common to rub the resin film surface with a cloth or the like in a predetermined direction. This alignment treating method by rubbing is an operation wherein a resin film surface formed on a substrate is rubbed with a cloth, and it is known that locally strongly or weakly rubbed portions are likely to result.

With conventional alignment treating agents such as polyimides, it is known that the tilt angle varies depending upon the rubbing strength. Especially with resin films intended to provide a large tilt angle of at least a few degrees, there has been a problem that the tilt angle is likely to substantially differ as between a case where the film is rubbed weakly and a case where the film is rubbed strongly, or the tilt angle will decrease when the film is rubbed strongly.

Namely, in the case of a display system where a high tilt angle is required as in the case of the STN display system, the tilt angle within the substrate surface area is likely to be non-uniform by rubbing, and an improvement in this respect has been desired to improve the uniformity of the display over the conventional level.

Further, to increase the uniformity of the tilt angle within the substrate surface area, it is common to apply rubbing sufficiently strongly. However, with conventional alignment treating agents capable of presenting a high tilt angle, the tilt angle tends to decrease, when they are strongly rubbed, whereby there has been a problem that no adequate tilt angle for a liquid crystal display device can be obtained.

Accordingly, it has been desired to develop an alignment treating agent for a liquid crystal cell having the change in the tilt angle due to the rubbing strength reduced, or an alignment treating agent whereby the tilt angle will not decrease even when subjected to strong rubbing treatment.

The present inventors have conducted extensive studies to solve the above problems and as a result, have accomplished the present invention.

The present invention provides an alignment treating agent for a liquid crystal cell, which comprises a polyimide resin of the formula (I):

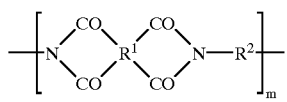

wherein $R^1$ is a tetravalent organic group constituting a tetracarboxylic acid or its derivative, $R^2$ is a bivalent organic group constituting a diamine, and m is a positive integer, provided that at least 10 mol % of $R^2$ is a bivalent organic group selected from the group consisting of:

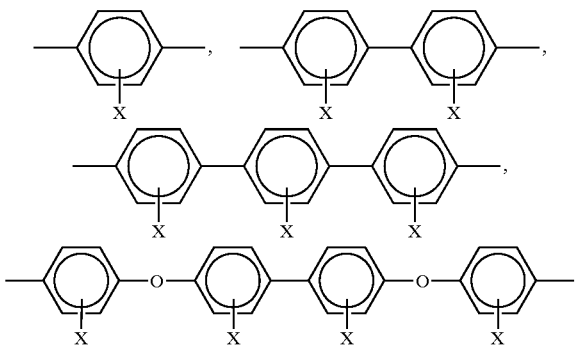

wherein X is H, OH, an alkyl group, an alkoxy group, a carboxyl group, an acyl group or a halogen atom, said polyimide resin being made insoluble in an organic solvent by coating a precursor solution of said polyimide resin on a substrate, followed by heating.

Now, the present invention will be described in detail with reference to the preferred embodiments.

In the polyimide of the formula (I) to be used for the alignment treating agent for a liquid crystal cell of the present invention, at least 10 mol % of $R^2$ constituting a diamine is required to be a diamine (hereinafter referred to simply as Diamine-A) selected from the group consisting of:

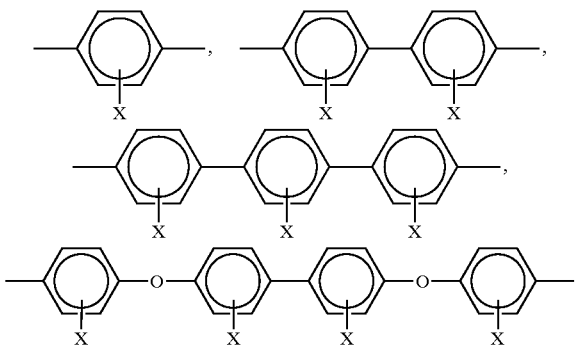

wherein X is as defined above. If the content of Diamine-A is less than 10 mol % of the total diamine of $R^2$, the desired stability of the tilt angle against rubbing treatment may not adequately be obtained.

The present invention has been made with respect to a polyimide resin which is made insoluble in an organic solvent when a precursor solution of the polyimide resin of the formula (I) is coated on a substrate and then heated.

Namely, in another aspect, the present invention is directed to a process which comprises coating a precursor solution of the polyimide resin of the formula (I) on a transparent substrate of e.g. glass or a plastic film provided with a transparent electrode by e.g. spin coating or printing, followed by heating to form a polyimide resin film insoluble in an organic solvent, and then applying rubbing treatment to the resin film to obtain an alignment treating agent for a liquid crystal cell.

Specific examples of Diamine-A include p-phenylenediamine, 1,4-bis(4-aminophenyl)benzene, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 3,3'-dichloro-4,4'-diaminobiphenyl, 3,3'-dicarboxy-4,4'-diaminobiphenyl and 4,4'-bis(4-aminophenoxy)biphenyl.

Specific examples of diamines other than Diamine-A among the diamines to be used for the alignment treating agent for a liquid crystal cell of the present invention, include aromatic diamines such as diaminodiphenylmethane, diaminodiphenyl ether, 2,2-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy) diphenylsulfone, 2,2-bis[4-(4-aminophenoxy)phenyl] propane and 1,1,1,3,3,3-hexafluoro-2,2-bis[4-(4-aminophenoxy)phenyl]propane; alicyclic diamines such as diaminodicyclohexylmethane, diaminodicyclohexyl ether and diaminocyclohexane; and aliphatic diamines such as 1,2-diaminoethane, 1,3-diaminopropane, 1,4-diaminobutane and 1,6-diaminohexane. Further, a diaminosiloxane of the following formula:

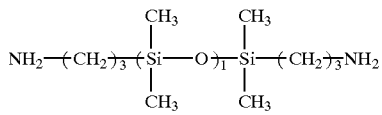

wherein l is an integer of from 1 to 10, may further be mentioned.

Furthermore, for the purpose of increasing the tilt angle, a diamine having a long chain alkyl group such as 4,4'-diamino-3-dodecyldiphenyl ether, 1-dodecanoxy-2,4-diaminobenzene, 1,1-bis(4-aminophenyl)cyclohexane or 2,2-bis[4-(4-aminophenoxy)phenyl]octane may also be used.

These diamines may be used alone or in combination as a mixture of two or more of them.

The tetracarboxylic acid or its derivative useful for the alignment treating agent for a liquid crystal cell of the present invention, is not particularly limited so long as it does not impart solubility in an organic solvent to the resulting polyimide resin. Specific examples of such a carboxylic acid or its derivative include aromatic tetracarboxylic acids such as pyromellitic acid, benzophenone tetracarboxylic acid, biphenyl tetracarboxylic acid and naphthalene tetracarboxylic acid, and their dianhydrides as well as their dicarboxylic acid diacid halides; alicyclic tetracarboxylic acids such as cyclobutane tetracarboxylic acid, cyclopentane tetracarboxylic acid and cyclohexane tetracarboxylic acid, and their dianhydrides as well as their dicarboxylic acid diacid halides; and aliphatic tetracarboxylic acid such as butane tetracarboxylic acid, and their dianhydrides as well as their dicarboxylic acid diacid halides.

These tetracarboxylic acid and their derivatives may be used alone or in combination as a mixture of two or more of them.

The method for producing a polyimide resin of the present invention is not particularly limited. However, it is common to employ a method wherein at least one tetracarboxylic acid or its derivative and the diamine are reacted and polymerized in a molar ratio within a range of from 0.50 to 1.00 or from 2.00 to 1.01 in an organic solvent to obtain a polyimide resin precursor having a reduced viscosity of from 0.05 to 3.0 dl/g (as measured in N-methyl-2-pyrrolidone at a temperature of 30° C. and at a concentration of 0.5 g/dl), which is then dehydrated for ring closure to form a polyimide resin.

Here, the temperature for reacting and polymerizing the tetracarboxylic acid or its derivative and the diamine is suitably selected from −20 to 150° C., preferably from −5 to 100° C.

As a method for polymerizing the polyimide resin precursor, a solution polymerization method is usually preferred. Specific examples of the solvent to be used for the solution polymerization method include N,N-dimethylformamide, N,N-dimethylacetamide, N-methyl-2-pyrrolidone, N-methylcaprolactam, dimethylsulfoxide, tetramethylurea, pyridine, dimethylsulfone, hexamethylphosphoramide and butyl lactone. These solvents may be used alone or in combination as a mixture. Further, a solvent which does not dissolve the polyimide resin precursor, may be added to the above solvent in an amount within such a range that a uniform solution can still be obtained.

To convert the polyimide resin precursor to the polyimide resin, a method of heating for dehydration ring-closure is employed. The heating temperature for dehydration ring-closure can be selected optionally within a range of from 150 to 450° C., preferably from 170 to 350° C. The time required for the dehydration ring-closure is usually from 30 seconds to 10 hours, preferably from 5 minutes to 5 hours, although it varies depending upon the reaction temperature.

Now, the present invention will be described in further detail with reference to Examples. However, it should be understood that the present invention is by no means restricted to such specific Examples.

EXAMPLE 1

32.841 g of 2,2-bis[4-(4-aminophenoxy)phenyl]propane and 4.256 g of 3,3'-dimethyl-4,4'-diaminobiphenyl were dissolved in 321.35 g of N-methyl-2-pyrrolidone (hereinafter sometimes referred to simply as NMP). Then, 19.416 g of cyclobutane tetracarboxylic dianhydride was added thereto, and the mixture was stirred and reacted at room temperature for 3 hours to obtain a polyimide resin precursor solution.

This solution was diluted with NMP to a total solid content of 4 wt %. Then, the solution was spin-coated at 3500 rpm on a glass substrate provided with a transparent electrode and then subjected to heat treatment at 250° C. for 60 minutes to form a polyimide resin film having a thickness of 1000 Å.

Then, to examine a change in the tilt angle against rubbing strength, the formed polyimide resin film was rubbed with a cloth so that the length of penetration of yarn tips of the rubbing cloth (YO-15N, manufactured by Yoshikawa Kako K.K.) into the polyimide film surface was varied at levels of 0.15 mm and 0.6 mm. A pair of substrates subjected to such rubbing treatment, were assembled with a spacer of 50 μm interposed therebetween so that the respective rubbing directions are opposingly in parallel with each other, and a liquid crystal (ZLI-2293, manufactured by Merck Co.) was injected into the space to obtain a cell having liquid crystal molecules aligned in parallel with the substrates.

With respect to the cells prepared by varying the rubbing strength, the tilt angles of liquid crystal molecules were measured by a crystal rotation method, whereby the cell weakly rubbed with the length of penetration of yarn tips of the rubbing cloth being 0.15 mm, had a tilt angle of 5.1°, and the cell strongly rubbed with the length of penetration being 0.6 mm, had a tilt angle of 5.4°. Thus, the change in the tilt angle due to variation in the rubbing strength was found to be very small.

Further, these cells were rotated under crossed nicol, whereby brightness and darkness were distinctly observed, thus indicating excellent alignment in the rubbing direction.

EXAMPLE 2

4.10 g of 2,2-bis[4-(4-aminophenoxy)phenyl]propane was added to 200.0 g of N-methyl-2-pyrrolidone, and the mixture was stirred to obtain a uniform solution. Then, 6.48 g of n-hexadecyl succinic anhydride was added thereto, and stirring was continued at room temperature for 4 hours. This solution was poured into a large amount of water, a white precipitate thereby formed was collected by filtration and dried under reduced pressure at 30° C. for 8 hours to obtain a precursor of a diimide compound having a $C_{16}$ alkyl chain.

Then, 32.841 g of 2,2-bis[4-(4-aminophenoxy)phenyl] propane and 4.256 g of 3,3'-dimethyl-4,4'-diaminobiphenyl were dissolved in 321.35 g of N-methyl-2-pyrrolidone, and 19.416 g of cyclobutane tetracarboxylic dianhydride was added thereto. The mixture was stirred and reacted at room temperature for 3 hours to obtain a polyimide resin precursor.

To 30 g of this polyimide resin precursor, 70 g of N-methyl-2-pyrrolidone and 0.3 g of the above diimide compound were added, and the mixture was thoroughly stirred to obtain a uniform solution.

The subsequent operation was conducted in the same manner as in Example 1 to obtain liquid crystal cells. With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 5.8°, and the cell strongly rubbed with the length of penetration being 0.6 mm, had a tilt angle of 6.0°. Thus, no decrease in the tilt angle due to an increase of the rubbing strength, was observed.

Further, these cells were rotated under crossed nicol, whereby brightness and darkness were distinctly observed, thus indicating excellent alignment in the rubbing direction.

EXAMPLE 3

29.557 g of 2,2-bis[4-(4-aminophenoxy)phenyl]propane. 3.821 g of 3,3'-dimethyl-4,4'-diaminobiphenyl and 4.829 g of n-hexadecylamine were dissolved in 327.64 g of N-methyl-2-pyrrolidone, and 19.416 g of cyclobutane tetracarboxylic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 12.1°, and the cell strongly rubbed with the length of penetration being 0.6 mm, had a tilt angle of 10.9°. Thus, the change in the tilt angle due to variation of the rubbing strength was small.

Further, these cells were rotated under crossed nicol, whereby brightness and darkness were distinctly observed, thus indicating excellent alignment in the rubbing direction.

EXAMPLE 4

41.477 g of 1,1,1,3,3,3-hexafluoro-2,2-bis[4-(4-aminophenoxy)phenyl]propane and 4.246 g of 3,3'- dimethyl-4,4'-diaminobiphenyl were dissolved in 370.23 g of N-methyl-2-pyrrolidone. Then, 19.416 g of cyclobutane tetracarboxylic dianhydride was added thereto, and the mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 9.3°, and the cell strongly rubbed with the length of penetration being 0.6 mm, had a tilt angle of 8.0°. Thus, the change in the tilt angle due to variation of the rubbing strength was small.

Further, these cells were rotated under crossed nicol, whereby brightness and darkness were distinctly observed, thus indicating excellent alignment in the rubbing direction.

EXAMPLE 5

24.631 g of 2,2'-bis[4-(4-aminophenoxy)phenyl]-propane, 4.246 g of 3,3'-dimethyl-4,4'-diaminobiphenyl and 320.39 g of 1-dodecanoxy-2,4-diaminobenzene were dissolved in 320.39 g of N-methyl-2-pyrrolidone, and 19.416 9 of cyclobutane tetracarboxylic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 5.5°, and the cell strongly rubbed with the length of penetration being 0.6 mm, had a tilt angle of 5.6°. Thus, the change in the tilt angle due to variation of the rubbing strength was very small.

Further, these cells were rotated under crossed nicol, whereby brightness and darkness were distinctly observed, thus indicating excellent alignment in the rubbing direction.

EXAMPLE 6

28.736 g of 2,2-bis[4-(4-aminophenoxy)phenyl]propane, 2.123 g of 3,3'-dimethyl-4,4'-diaminobiphenyl and 5.849 g of 1-dodecanoxy-2,4-diaminobenzene were dissolved in 319.15 g of N-methyl-2-pyrrolidone, and 19.416 g of cyclobutane tetracarboxylic dianhydride was added thereto. Then, the mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 6.3°, and the cell strongly rubbed with the length of penetration being 0.6 mm, had a tilt angle of 5.6°. Thus, the change in the tilt angle due to variation of the rubbing strength was small.

Further, these cells were rotated under crossed nicol, whereby brightness and darkness were distinctly observed, thus indicating excellent alignment in the rubbing direction.

EXAMPLE 7

24.631 g of 2,2-bis[4-(4-aminophenoxy)phenyl]propane, 4.246 g of 3,3'-dimethyl-4,4'-diaminobiphenyl and 5.849 g of 1-dodecanoxy-2,4-diaminobenzene were dissolved in 320.39 g of N-methyl-2-pyrrolidone, and 21.590 g of pyromellitic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 7.2°, and the cell strongly rubbed with the length of penetration being 0.6 mm, had a tilt angle of 6.0°. Thus, the change in the tilt angle due to variation of the rubbing strength was small.

Further, these cells were rotated under crossed nicol, whereby brightness and darkness were distinctly observed, thus indicating excellent alignment in the rubbing direction.

EXAMPLE 8

16.984 g of 3,3'-dimethyl-4,4'-diaminobiphenyl and 5.849 g of 1-dodecanoxy-2,4-diaminobenzene were dissolved in 251.75 g of N-methyl-2-pyrrolidone, and 21.594 g of pyromellitic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 4°, and the cell strongly rubbed with the length of penetration being 0.6 mm, had a tilt angle of 5.4°. Thus, no decrease in the tilt angle due to an increase of the rubbing strength was observed.

EXAMPLE 9

17.296 g of 3,3'-dimethyl-4,4'-diaminobiphenyl and 5.849 g of 1-dodecanoxy-2,4-diaminobenzene were dissolved in 253.52 g of N-methyl-2-pyrrolidone, and 21.594 g of pyromellitic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 5°, and the cell strongly rubbed with the length of penetration being 0.6 mm, had a tilt angle of 6.3°. Thus, no decrease in the tilt angle due to an increase of the rubbing strength was observed.

EXAMPLE 10

29.475 g of 4,4'-bis(4-aminophenoxy)biphenyl and 5.849 g of 1-dodecanoxy-2,4-diaminobenzenen were dissolved in 323.77 g of N-methyl-2-pyrrolidone, and 21.594 g of pyromellitic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 3.9°, and the cell strongly rubbed with the length of penetration being 0.6 mm, had a tilt angle of 4.4°. Thus, no decrease in the tilt angle due to an increase of the rubbing strength was observed.

COMPARATIVE EXAMPLE 1

In Example 1, 41.052 g of 2,2-bis[4-(4-aminophenoxy)phenyl] was dissolved in N-methyl-2-pyrrolidone without using 3,3'-dimethyl-4,4'-diaminobiphenyl, and 19.415 g of cyclobutane tetracarboxylic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method. The cell weakly rubbed with the length of penetration of yarn tips of the rubbing cloth being 0.15 mm, had a tilt angle of 5.1°, and the cell strongly rubbed with the length of penetration being 0.6 mm, had a tilt angle of 3.8°. Thus, a decrease in the tilt angle due to an increase of the rubbing strength was observed.

COMPARATIVE EXAMPLE 2

In the same manner as in Comparative Example 1, without using 3,3'-dimethyl-4,4'-diaminobiphenyl, 41.052 g of 2,2-bis[4-(4-aminophenoxy)phenyl]propane was dissolved in 343.76 g of N-methyl-2-pyrrolidone, and 19.415 g of cyclobutane tetracarboxylic dianhydride was added thereto. The mixture was stirred and reacted at room temperature for 3 hours to obtain a polyimide resin precursor.

To 30 g of this polyimide resin precursor, 70 g of N-methyl-2-pyrrolidone and 0.3 g of a diimide compound having a $C_{16}$ alkyl chain prepared in the same manner as in Example 2, were added, and the mixture was thoroughly stirred to obtain a uniform solution.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 6.5°, and the cell strongly rubbed with the length of penetration being 0.6 mm, had a tilt angle of 4.8°. Thus, a decrease in the tilt angle due to an increase of the rubbing strength was observed.

COMPARATIVE EXAMPLE 3

36.947 g of 2,2-bis[4-(4-aminophenoxy)phenyl]propane and 4.829 9 of n-hexadecylamine were dissolved in 347.87 g of N-methyl-2-pyrrolidone, and 19.416 g of cyclobutane tetracarboxylic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 10.0°, and the cell strongly rubbed with the length of penetration being 0.6 mm, had a tilt angle of 5.7°. Thus, the tilt angle decreased substantially due to an increase of the rubbing strength.

COMPARATIVE EXAMPLE 4

51.846 g of 1,1,1,3,3,3-hexafluoro-2,2-bis[4-(4-aminophenoxy)phenyl]propane was dissolved in 429.05 g of N-methyl-2-pyrrolidone, and 19.416 g of cyclobutane tetracarboxylic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 10.3°, and the cell strongly rubbed with the length of penetration being 0.6 mm, had a tilt angle of 4.2°. Thus, the tilt angle substantially decreased by an increase of the rubbing strength.

COMPARATIVE EXAMPLE 5

32.841 g of 2,2-bis[4-(4-aminophenoxy)phenyl]propane and 5.849 g of 1-dodecanoxy-2,4-diaminobenzene were dissolved in 329.27 g of N-methyl-2-pyrrolidone, and 19.416 g of cyclobutane tetracarboxylic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 7.3°, and the cell strongly rubbed with the length of penetration being 0.6 mm, had a tilt angle of 5.1°. Thus, the tilt angle decreased due to an increase of the rubbing strength.

COMPARATIVE EXAMPLE 6

32.841 g of 2,2-bis[4-(4-aminophenoxy)phenyl]propane and 5.849 g of 1-dodecanoxy-2,4-diaminobenzene were dissolved in 341.61 g of N-methyl-2-pyrrolidone, and 21.594 g of pyromellitic dianhydride was added thereto. The mixture was stirred and reacted at room temperature for 3 hours to obtain a polyimide resin precursor.

The subsequent operation was conducted in the same manner as in Example 1 to obtain liquid crystal cells.

With respect to the cells prepared by varying the rubbing strength, the tilt angles were measured by a crystal rotation method, whereby the cell weakly rubbed with the length of penetration of yarn tips of the rubbing cloth being 0.15 mm, had a tilt angle of 8.0°, and the cell strongly rubbed with the length of penetration being 0.6 mm, had a tilt angle of 4.1°. Thus, the tilt angle substantially decreased due to an increase of the rubbing strength.

By using the alignment treating agent for a liquid crystal according to the present invention, it is possible to reduce the change in the tilt angle due to a change in the rubbing condition and to provide a uniform tilt angle. Further, it is possible to obtain a large tilt angle even under a strong rubbing condition.

What is claimed is:

1. An alignment treating agent for a super-twisted nematic liquid crystal cell, which comprises a polyimide resin of the formula (I):

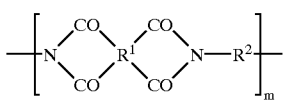
(I)

wherein $R^1$ is a tetravalent organic group constituting a tetracarboxylic acid selected from the group consisting of pyromellitic acid, benzophenone tetracarboxylic acid, biphenyl tetracarboxylic acid, cyclobutane tetracarboxylic acid, cyclopentane tetracarboxylic acid, cyclohexane tetracarboxylic acid and butane tetracarboxylic acid, and dianhydrides and diacid halides thereof; and $R^2$ is a bivalent organic group constituting a diamine, and m is a positive integer, provided that at least 10 mol % of $R^2$ is a bivalent organic group selected from the group consisting of:

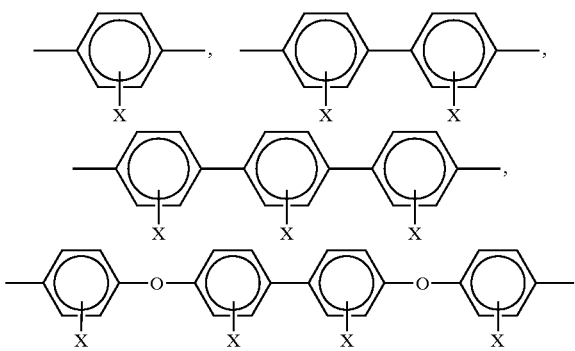

and wherein X is H, OH, $CH_3$, $CH_3O$, COOH or Cl, said polyimide resin being made insoluble in an inorganic solvent by coating a precursor solution of said polyimide resin on a substrate, followed by heating at 170 to 350° C.

2. The alignment treating agent according to claim 1, wherein at least 10 mol % of $R^2$ is a bivalent organic group constituting a diamine selected from the group consisting of p-phenylenediamine, 1,4-bis(4-aminophenyl)benzene, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 3,3'-dichloro-4,4'-diaminobiphenyl, 3,3'-dicarboxy-4,4'-diaminobiphenyl and 4,4'-bis(4-aminophenoxy)biphenyl.

3. The alignment treating agent of claim 1, wherein $R^2$ is a bivalent organic group constituting a diamine selected from the group consisting of p-phenylenediamine, 1,4-bis(4-aminophenyl)benzene, 4,4'-diaminobiphenyl, 3,3'-dimethyl-4,4'-diaminobiphenyl, 3,3'-dimethoxy-4,4'-diaminobiphenyl, 3,3'-dihydroxy-4,4'-diaminobiphenyl, 3,3'-dichloro-4,4'-diaminobiphenyl, 3,3'-dicarboxy-4,4'-diaminobiphenyl, 4,4'-bis(4-aminophenoxy)biphenyl, diaminodiphenylmethane, diaminodiphenyl ester, 2,2-diaminodiphenylpropane, 4,4'-diaminodiphenylsulfone, diaminobenzophenone, 1,3-bis(4-aminophenoxy)benzene, 1,4-bis(4-aminophenoxy)benzene, 4,4'-di(4-aminophenoxy)diphenylsulfone, 2,2-bis[4-(4-aminophenoxy)phenyl] propane, 1,1,1,3,3,3-hexafluoro-2,2-bis[4-(4-aminophenoxy)phenyl]propane, diaminodicyclohexylmethane, diaminodicyclohexyl ether, diaminocyclohexne, 1,2-diaminoethane, 1,3-diaminopropane, 1,4-diaminobutane, 1,6-diaminohexane, a diaminosiloxane of the formula:

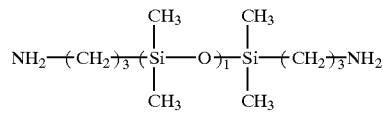

wherein l is an integer of from 1 to 10, 4,4'-diamino-3-dodecyldiphenylether, 1-dodecanoxy2,5-diaminobenzene, 1,1-bis(4-aminophenyl)cyclohexane, and 2,2-bis[4-(4-aminophenoxy)phenyl]octane.

4. The alignment treating agent of claim 1, wherein X is selected from the group consisting of COOH and Cl.

5. A process for producing an alignment treating agent for a super-twisted nematic liquid crystal cell, which comprises coating a precursor solution of a polyimide resin of the formula (I):

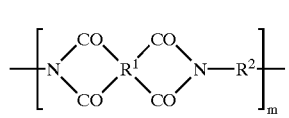
(I)

wherein $R^1$ is a tetravalent organic group constituting a tetracarboxylic acid selected from the group consisting of pyromellitic acid, benzophenone tetracarboxylic acid, biphenyl tetracarboxylic acid, cyclobutane tetracarboxylic acid, cyclopentane tetracarboxylic acid, cyclohexane tetracarboxylic acid and butane tetracarboxylic acid, and dianhydrides and diacid halides thereof, and $R^2$ is a bivalent organic group constituting a diamine, and m is a positive integer, provided with at least 10 mol % of $R^2$ is a bivalent organic group selected from the group consisting of:

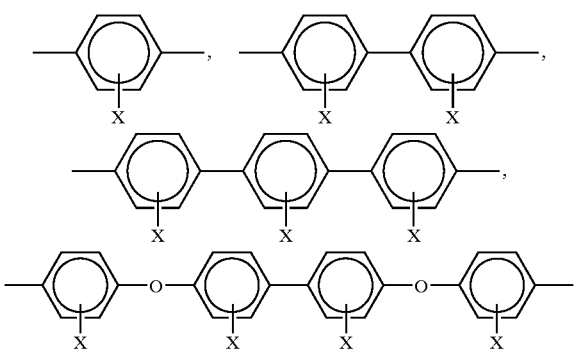

and wherein X is H, OH, $CH_3$, $CH_3O$, COOH or Cl, on a transparent substrate, heating the precursor solution to form a polyimide resin film, and applying a rubbing treatment to the resin film.

6. The process of claim 5, wherein the precursor solution of the polyimide resin is prepared by reacting the tetracarboxylic acid and the diamine in a molar ratio of from 0.50 to 1.00 in an organic solvent to obtain a polyimide resin precursor having a reduced viscosity of from 0.05 to 3.0 dl/g as measured in N-methyl-2-pyrrolidone at a temperature of 30° C. at a concentration of 0.5 to g/dl.

7. The process of claim 5, wherein the precursor solution is heated at a temperature of from 150 to 350° C. for from 30 seconds to 10 hours for dehydration ring closure to form the polyimide resin.

8. The process of claim 5, wherein X is selected from the group consisting of COOH and Cl.

9. A super-twisted nematic device, comprising, as an alignment layer, the alignment treating agent of claim 1.

10. The super-twisted nematic device of claim 9, wherein said alignment layer is prepared by the process of claim 5.

* * * * *